(12) United States Patent
Ohashi et al.

(10) Patent No.: US 11,959,892 B2
(45) Date of Patent: Apr. 16, 2024

(54) LIQUID CHROMATOGRAPH WITH IMPROVED DEFECT ELIMINATION

(71) Applicant: SHIMADZU CORPORATION, Kyoto (JP)

(72) Inventors: Hiroshi Ohashi, Kyoto (JP); Takayuki Kihara, Kyoto (JP); Hiroshi Miura, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 372 days.

(21) Appl. No.: 17/436,102

(22) PCT Filed: Mar. 6, 2019

(86) PCT No.: PCT/JP2019/008798
§ 371 (c)(1),
(2) Date: Sep. 3, 2021

(87) PCT Pub. No.: WO2020/179001
PCT Pub. Date: Sep. 10, 2020

(65) Prior Publication Data
US 2022/0187255 A1   Jun. 16, 2022

(51) Int. Cl.
G01N 30/00 (2006.01)
G01N 30/32 (2006.01)
(Continued)

(52) U.S. Cl.
CPC ............ *G01N 30/32* (2013.01); *G01N 30/88* (2013.01); *G01N 2030/027* (2013.01); *G01N 2030/8804* (2013.01)

(58) Field of Classification Search
None
See application file for complete search history.

(56) References Cited

U.S. PATENT DOCUMENTS

| 4,905,161 A * | 2/1990 | Miller ............... G01N 30/32 700/282 |
| 2009/0090173 A1* | 4/2009 | Fukuda ............. G01N 30/34 73/61.55 |

(Continued)

FOREIGN PATENT DOCUMENTS

| JP | 11-326300 A | 11/1999 |
| JP | 2007-139623 A | 6/2007 |
| WO | 2017-006410 A1 | 1/2017 |

OTHER PUBLICATIONS

Office Action for corresponding Chinese Patent Application No. 201980093583.8 dated Jul. 17, 2023, with English machine translation.

(Continued)

Primary Examiner — Brandi N Hopkins
Assistant Examiner — Nigel H Plumb
(74) Attorney, Agent, or Firm — Renner, Otto, Boisselle & Sklar, LLP

(57) ABSTRACT

A liquid chromatograph is presented which enables automatic resolution of a liquid sending failure when the liquid sending failure caused by a liquid sending pump occurs, and execution of a new analysis with good reproducibility after the liquid sending failure is resolved. The liquid sending failure can be automatically resolved by a purging operation. A sample remaining in the analysis flow path is washed away by a non-injection analysis after the liquid sending failure is resolved, and a new analysis can be executed with good reproducibility.

8 Claims, 3 Drawing Sheets

(51) Int. Cl.
    *G01N 30/88*     (2006.01)
    *G01N 30/02*     (2006.01)

(56) References Cited

U.S. PATENT DOCUMENTS

2016/0202218 A1*   7/2016   Owa ...................... G01N 30/16
                                                                          73/23.41
2020/0033302 A1    1/2020   Yasunaga

OTHER PUBLICATIONS

Office Action for corresponding Japanese Patent Application No. 2021-503325, dated Mar. 8, 2022, with English machine translation.
International Search Report for corresponding International Patent Application No. PCT/JP2019/008798 dated Jun. 4, 2019.
Written Opinion of the International Searching Authority for corresponding PCT International Patent Application No. PCT/JP2019/008798 dated Jun. 4, 2019, (English language Machine Translation).
Decision of Refusal in corresponding Chinese Patent Application No. 201980093583.8 dated Dec. 11, 2023, with English machine translation.

* cited by examiner

LIQUID CHROMATOGRAPH WITH IMPROVED DEFECT ELIMINATION

TECHNICAL FIELD

The present invention relates to a liquid chromatograph.

BACKGROUND ART

A liquid chromatograph supplies a mobile phase into an analysis flow path in which a separation column is provided using a liquid sending pump, injects a sample into the analysis flow path at a position farther upstream than the separation column, separates a sample into components in the separation column and detects separated sample components using a detector (see Patent Document 1).

In liquid chromatography, stability of a liquid sending flow rate of a mobile phase has a great impact on a result of analysis. The liquid sending flow rate may change due to generation of bubbles in a pump chamber of a liquid sending pump during a sample analysis, and a liquid sending failure may occur. When such a liquid sending failure occurs, the baseline of a detector signal is disrupted, and reproducibility of a result of analysis is degraded. Therefore, in a case where a liquid sending failure occurs due to the liquid sending pump during an analysis, a re-analysis is often required.

In particular, in a case where a plurality of samples are successively analyzed in accordance with a preset analysis schedule, when a liquid sending failure caused by a liquid sending pump occurs during a scheduled analysis, a sample analysis that is executed after the liquid sending failure has occurred is unreliable, and the time spent for the analysis, the samples and a solvent are wasted.

As such, it is suggested that, when a liquid sending failure in a liquid sending pump occurs during an analysis, the analysis is interrupted, a liquid sending pump is connected to a drain, a purge operation of sending a mobile phase at a high flow rate is executed, and the liquid sending failure is automatically resolved (Patent Document 2). After the liquid sending failure is resolved, the interrupted analysis is restarted.

CITATION LIST

Patent Document

[Patent Document 1] WO 2017/006410 A1
[Patent Document 2] JP 11-326300 A

SUMMARY OF INVENTION

Technical Problem

As described above, when a liquid sending failure occurs, after an analysis is interrupted and a purge operation is executed, it is preferable from the viewpoint of reproducibility of a result of analysis that the interrupted analysis is restarted again from the beginning, or the analysis of a sample is skipped and an analysis of a next sample is executed. However, a sample according to the interrupted analysis remains in the analysis flow path, and it is considered that the sample has an impact on a result of next analysis.

As such, an object of the present invention is to enable automatic resolution of a liquid sending failure when the liquid sending failure caused by a liquid sending pump occurs, and execution of a new analysis with good reproducibility after the liquid sending failure is resolved.

Solution to Problem

A first aspect the present invention relates to a liquid chromatograph that includes a liquid sending pump that sends a mobile phase, an analysis flow path having a separation column for separating a sample into components and a detector for detecting sample components obtained by separation in the separation column, a pressure sensor that detects a liquid sending pressure applied by the liquid sending pump, a sample injector for injecting a sample into the analysis flow path, a switcher for switching a state between the liquid sending pump and the analysis flow path to a connection state or a disconnection state, a liquid sending failure detector configured to compare a variation range of the liquid sending pressure detected by the pressure sensor with a preset threshold value, and detect a liquid sending failure caused by the liquid sending pump when the variation range of the liquid sending pressure exceeds the threshold value, an analysis operation executer configured to control operations of the liquid sending pump, the sample injector and the switcher, and execute an analysis by putting the state between the liquid sending pump and the analysis flow path in a connection state and injecting a sample into the analysis flow path, as a scheduled analysis in regard to all of samples scheduled to be analyzed in a preset analysis schedule, a purge operation executer, when a liquid sending failure is detected by the liquid sending failure detector during a sample analysis, configured to interrupt a sample analysis in execution, put the state between the liquid sending pump and the analysis flow path in a disconnection state and execute a purge operation of sending a liquid mobile using the liquid sending pump at a flow rate higher than a flow rate during the analysis for a preset purge time, a confirming operation executer configured to execute a confirming operation of confirming whether a liquid sending failure is detected by the liquid sending failure detector after the purge operation ends, and a non-injection analysis executer, when a liquid sending failure is not detected by the liquid sending failure detector in the confirming operation, configured to execute a non-injection analysis in which a mobile phase is sent into the analysis flow path by the liquid sending pump under a condition that enables removal of a sample in an analysis flow path, wherein the analysis operation executer is configured to restart the scheduled analysis after the non-injection analysis is executed.

Advantageous Effects of Invention

The liquid chromatograph according to the present invention, when a liquid sending failure is detected by the liquid sending failure detector during a sample analysis, is configured to interrupt a sample analysis in execution, put the state between the liquid sending pump and the analysis flow path in a disconnection state and execute a purge operation of sending a liquid mobile using the liquid sending pump at a flow rate higher than a flow rate during the analysis for a preset purge time, is configured to execute a confirming operation of confirming whether a liquid sending failure is detected by the liquid sending failure detector after the purge operation ends, and when a liquid sending failure is not detected by the liquid sending failure detector in the confirming operation, and is configured to execute a non-injection analysis in which a mobile phase is sent into the analysis flow path by the liquid sending pump under a condition that enables removal of a sample in an analysis flow path. Thus, when a liquid sending failure caused by the liquid sending pump occurs, the liquid sending failure can be automatically resolved by the purging operation, a sample remaining in the analysis flow path is washed away by the non-injection analysis after the liquid sending failure is resolved, and a new analysis can be executed with good reproducibility.

DESCRIPTION OF EMBODIMENTS

One inventive example of a liquid chromatograph will be described below with reference to the drawings.

Figure 1:
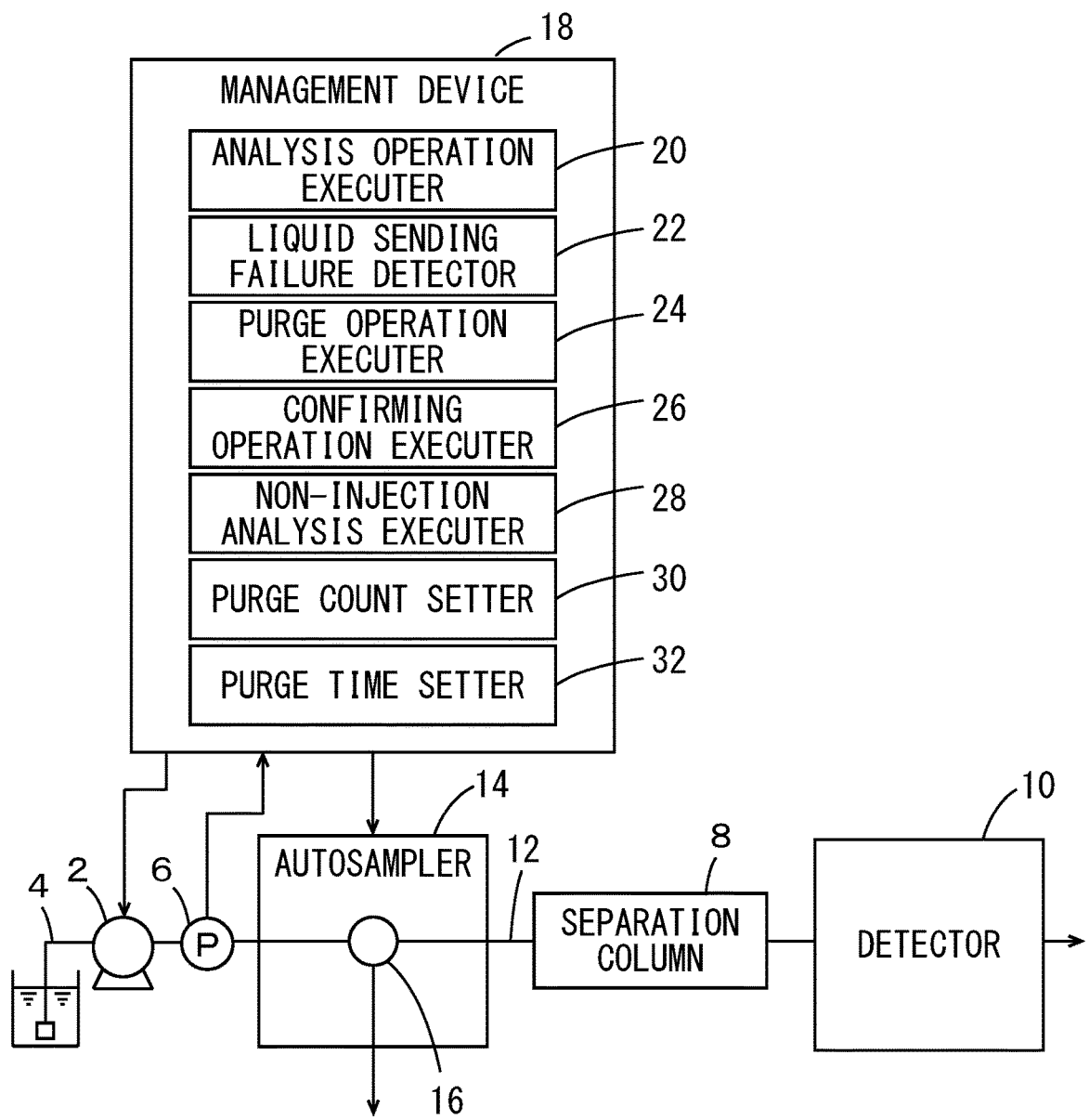
FIG. 1 A schematic diagram showing the configuration of one inventive example of a liquid chromatograph.

As shown in FIG. 1, the liquid chromatograph of the inventive example includes a liquid sending pump 2, a mobile phase supply flow path 4, a pressure sensor 6, a separation column 8, a detector 10, an analysis flow path 12, an autosampler 14 and a management device 18.

The liquid sending pump 2 is to send a mobile phase and is provided on the mobile phase supply flow path 4. The pressure sensor 6 is provided on the mobile phase supply flow path 4 and detects a liquid sending pressure applied by the liquid sending pump 2.

The separation column 8 and the detector 10 are provided on the analysis flow path 12. The autosampler 14 is provided between the mobile phase supply flow path 4 and the analysis flow path 12. The autosampler 14 constitutes a sample injector that injects a sample into the analysis flow path 12.

Figure 2:
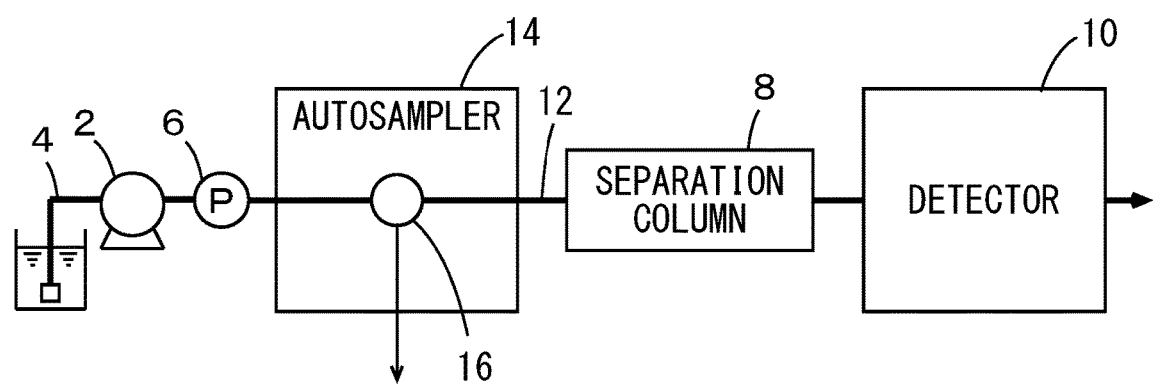
FIG. 2 A diagram of the configuration of a flow path showing a mobile phase supply flow path being connected to an analysis flow path with a thick line in the same inventive example.
Figure 3:
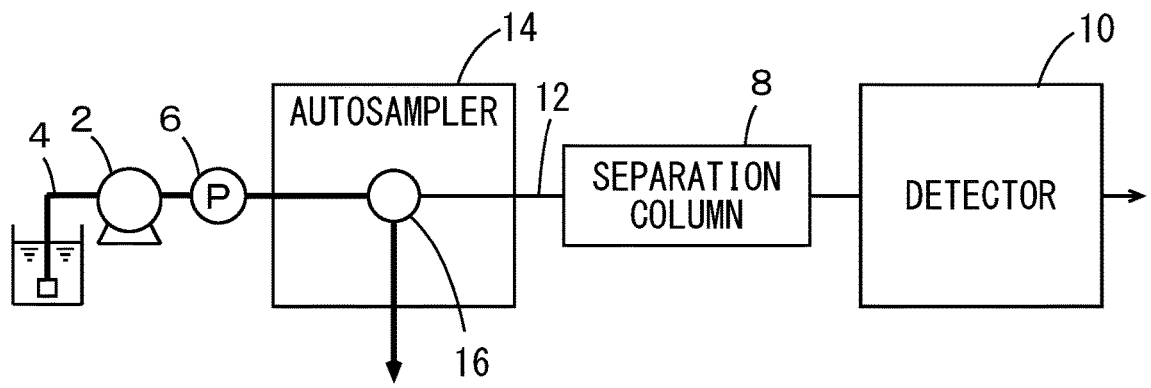
FIG. 3 A diagram of the configuration of a flow path showing the mobile phase supply flow path being connected to a drain with a thick line in the same inventive example.

The autosampler 14 includes a switch valve 16 that has a function of switching between a state where the mobile phase supply flow path 4 is fluidically connected to the analysis flow path 12 as shown in FIG. 2 and a state where the mobile phase supply flow path 4 is fluidically connected to a drain as shown in FIG. 3. That is, the switch valve 16 realizes a switcher for switching the state between the liquid sending pump 2 and the analysis flow path 12 to a connection state or a disconnection state. The switch valve 16 may be an injection valve for switching between provision and non-provision of a sample loop (not shown) holding a sample between the mobile phase supply flow path and the analysis flow path.

The management device 18 is to manage the operations of the liquid sending pump and the autosampler 14 and realized by a general personal computer or a dedicated computer, for example. The management device 18 includes an analysis operation executer 20, a liquid sending failure detector 22, a purge operation executer 24, a confirming operation executer 26, a non-injection analysis executer 28, a purge count setter 30 and a purge time setter 32. The analysis operation executer 20, the liquid sending failure detector 22, the purge operation executer 24, the confirming operation executer 26, the non-injection analysis executer 28, the purge count setter 30 and the purge time setter 32 are obtained by execution of a predetermined program by a CPU (Central Processing Unit) provided in the management device 18.

The analysis operation executer 20 is configured to execute chromatography in regard to all of samples that are scheduled to be analyzed in a preset analysis schedule as a scheduled analysis. When an analysis in regard to one sample is executed, the mobile phase supply flow path 4 and the analysis flow path 12 are fluidically connected (the state of FIG. 2). Then, the analysis is started when the sample is injected by the autosampler 14 into the analysis flow path 12. Whether an analysis in regard to one sample has ended can be determined based on whether a predetermined period of time has elapsed since injection of the sample into the analysis flow path (the start of the analysis). A scheduled analysis means that a series of operations, from the time when a sample is injected into the analysis flow path until the time when a predetermined period of time elapses and the analysis ends, are executed in regard to all of the samples scheduled to be analyzed in an analysis schedule.

The liquid sending failure detector 22 is configured to compare the variation range of a liquid sending pressure detected by the pressure sensor 6 with a preset threshold value and detect a liquid sending failure in the liquid sending pump 2 when the variation range of the liquid sending pressure exceeds the threshold value. The liquid sending failure detector 22 detects a liquid sending failure during an analysis of a sample and during a confirming operation. Here, the variation range of a liquid sending pressure means a difference between the highest value and the lowest value of the liquid sending pressure in a certain period of time.

The purge operation executer 24 is configured to execute a purge operation when a liquid sending failure is detected by the liquid sending failure detector 22 during an analysis of a sample. A purge operation means that the mobile phase supply flow path 4 is fluidically connected to the drain, and a mobile phase is sent by the liquid sending pump 2 for a predetermined period of time at a flow rate higher than a flow rate during an analysis.

The confirming operation executer 26 is configured to fluidically connect the mobile phase supply flow path 4 to the analysis flow path 12 and execute a confirming operation of sending a mobile phase for a predetermined period of time using the liquid sending pump 2 at a flow rate about the same as a flow rate during an analysis, for example, after the above-mentioned purge operation is executed.

In a case where a liquid sending failure is detected by the liquid sending failure detector 22 during the above-mentioned confirming operation, the purge operation executer 24 is configured to execute the purge operation again. However, in a case where a liquid sending failure is not resolved even when the purge operation is executed a predetermined number of times, it is determined that there is abnormality in the liquid sending pump 2, and the analysis operation executer 20 is configured to end a scheduled analysis.

The non-injection analysis executer 28 is configured to execute a non-injection analysis in a case where a liquid sending failure is not detected during the above-mentioned confirming operation. A non-injection analysis means that a sample is not injected and only a mobile phase is sent into the analysis flow path 12 for removal of a sample remaining in the analysis flow path 12 from the analysis flow path 12. Although a mobile phase that is sent into the analysis flow path 12 in a non-injection analysis may have the same conditions (a flow rate, composition, a gradient profile, etc.) as the conditions in regard to an analysis that has been interrupted due to detection of a liquid sending failure, not all of the conditions has to be the same as the conditions in regard to the interrupted analysis. That is, the conditions only needs to be the conditions with which a sample in the analysis flow path can be removed.

The analysis operation executer 20 is configured to restart the scheduled analysis after the above-mentioned non-injection analysis ends. At this time, a sample that is scheduled to be analyzed next after the sample according to the interrupted analysis in the analysis schedule may be injected into the analysis flow path 12, and the scheduled analysis may be restarted. However, in a case where the sample according to the interrupted sample remains in a sample container, the sample according to the interrupted analysis may be injected again into the analysis flow path 12, and the scheduled analysis may be restarted.

Further, the analysis operation executer 20 may be configured to execute warm up to send a mobile phase having an initial concentration in the analysis of a sample into the analysis flow path 12 for a predetermined period of time before injecting the sample into the analysis flow path 12, in a case where the scheduled analysis is restarted. In this case, a user may be able to set a warm-up time as desired with respect to the management device 18.

Further, when the count of a liquid sending failure detected by the liquid sending failure detector 22 exceeds a preset allowable count, the analysis operation executer 20 is configured to determine that there is abnormality in the liquid sending pump 2, and end a scheduled analysis.

The purge count setter 30 is configured to set the count of the purge operation that is used as a criterion for determining whether there is abnormality in the liquid sending pump 2 based on information input by the user. That is, the user can set the count of the purge operation that is used as a criterion for determining whether there is abnormality in the liquid sending pump 2 as desired. In a case where it is determined that there is abnormality in the liquid sending pump 2, a scheduled analysis ends. The function of the purge count setter 30 is not required.

The purge time setter 32 is configured to set the period of time during which a purge operation is executed based on information input by the user. That is, the user can set the period of time during which a purge operation is executed as desired. The function of the purge time setter 32 is not required.

Figure 4:
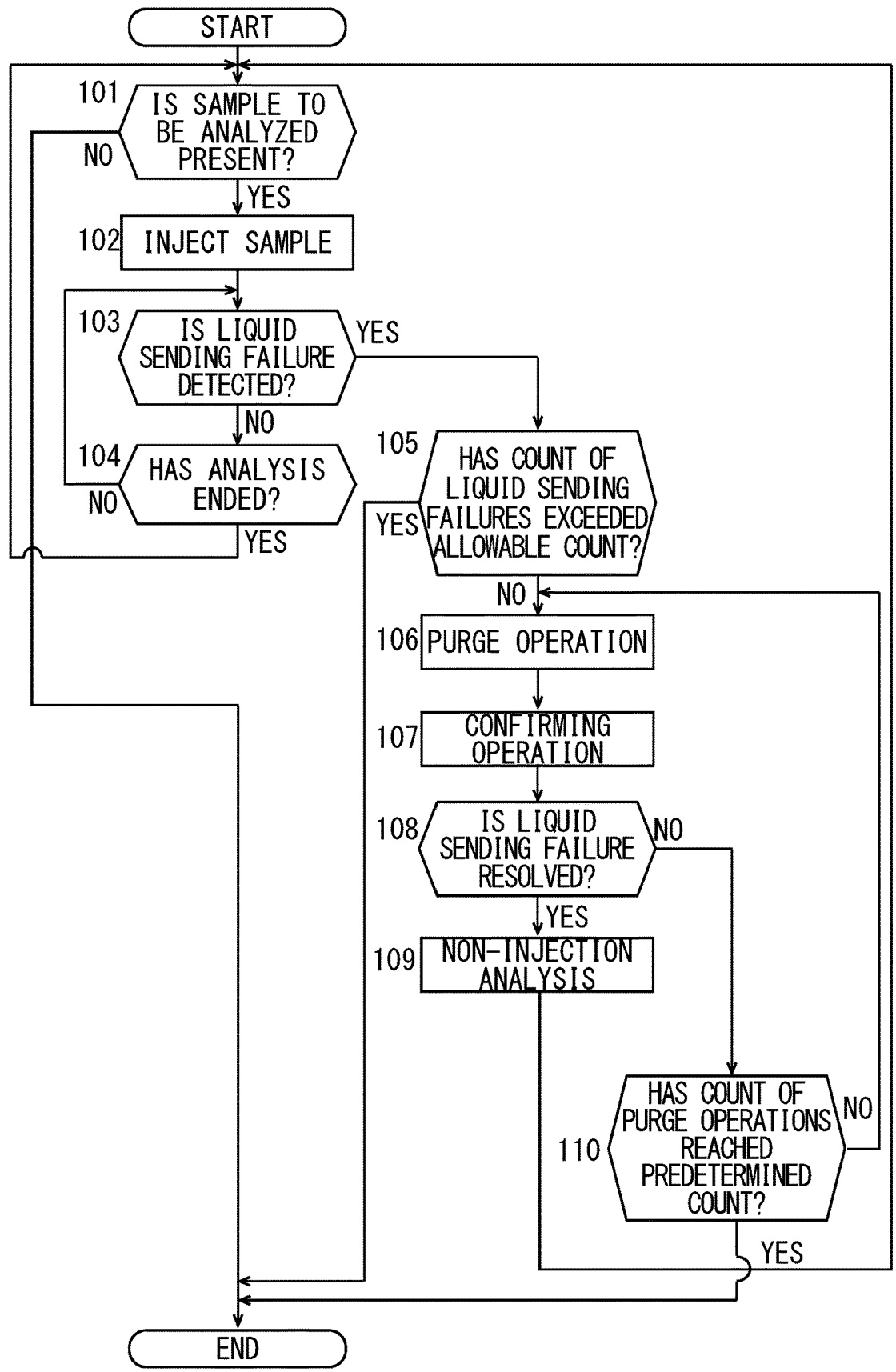
FIG. 4 A flowchart for explaining the operation of the same inventive example.

One example of an operation during a scheduled analysis realized by the above-mentioned function will be described with reference to FIG. 1 and the flow chart of FIG. 4.

When the scheduled analysis is started, the analysis operation executer 20 injects a sample scheduled to be analyzed into the analysis flow path 12 as long as a sample to be analyzed is present (steps 101, 102). During the sample analysis, the liquid sending failure detector 22 calculates the variation range of a liquid sending pressure detected by the pressure sensor 6 at constant time intervals and compares the calculated variation ranges with a threshold value, and monitors whether a liquid sending failure has occurred (step S103). In a case where a liquid sending failure is not detected until the analysis of sample ends (step 104), the process proceeds to an analysis of a next sample, and the scheduled analysis ends when the analyses of all samples end.

In a case where the liquid sending failure detector 22 detects a liquid sending failure during the sample analysis (step 103), the analysis operation executer 20 interrupts the scheduled analysis. Then, in a case where the count of liquid sending failures that have occurred during the scheduled analysis does not exceed a preset allowable count (five, for example), the purge operation executer 24 executes a purge operation (steps 105, 106). After the purge operation ends, the confirming operation executer 26 executes a confirming operation in regard to whether a liquid sending failure has been resolved (step 107). In a case where the liquid sending failure is resolved, the non-injection analysis executer 28 executes a non-injection analysis (steps 108, 109).

The analysis operation executer 20 restarts the scheduled analysis after the non-injection analysis ends (step 101). On the other hand, in a case where a liquid sending failure is detected in the confirming operation after the purge operation (step 108), the purge operation executer 24 repeatedly executes the purge operation until the liquid sending failure is resolved as long as the count of the purge operation does not exceed a predetermined count (three, for example) (step 110). In a case where the liquid sending failure is not resolved even when the purge operation is repeatedly executed the number of times corresponding to the predetermined count (step 110), the analysis operation executer 20 ends the scheduled analysis. In a case where the analysis ends due to a liquid sending failure, a data file is preferably created in the form of being distinguishable from a normal data file for non-detection of a liquid sending failure.

In a case where the liquid sending failure detector 22 detects a liquid sending failure during the sample analysis (step 103), and the count of liquid sending failures that have occurred during the scheduled analysis exceeds the allowable count, the scheduled analysis ends (step 105).

While the switcher for switching the state between the liquid sending pump 2 and the analysis flow path 12 to the connection state or the disconnection state is realized by the switch valve 16 in the autosampler 14 in the inventive example described above, the present invention is not limited to this. A switcher for switching the state between the liquid sending pump 2 and the analysis flow path 12 to the connection state or the disconnection state may be separately provided at a position farther upstream than the autosampler 14.

In an embodiment of a liquid chromatograph according to the present invention, the liquid chromatograph includes a liquid sending pump that sends a mobile phase, an analysis flow path having a separation column for separating a sample into components and a detector for detecting sample components obtained by separation in the separation column, a pressure sensor that detects a liquid sending pressure applied by the liquid sending pump, a sample injector for injecting a sample into the analysis flow path, a switcher for switching a state between the liquid sending pump and the analysis flow path to a connection state or a disconnection state, a liquid sending failure detector configured to compare a variation range of the liquid sending pressure detected by the pressure sensor with a preset threshold value, and detect a liquid sending failure caused by the liquid sending pump when the variation range of the liquid sending pressure exceeds the threshold value, an analysis operation executer configured to control operations of the liquid sending pump, the sample injector and the switcher, and execute an analysis by putting the state between the liquid sending pump and the analysis flow path in a connection state and injecting a sample into the analysis flow path, as a scheduled analysis in regard to all of samples scheduled to be analyzed in a preset analysis schedule, a purge operation executer, when a liquid sending failure is detected by the liquid sending failure detector during a sample analysis, configured to interrupt a sample analysis in execution, put the state between the liquid sending pump and the analysis flow path in a disconnection state and execute a purge operation of sending a liquid mobile using the liquid sending pump at a flow rate higher than a flow rate during the analysis for a preset purge time, a confirming operation executer configured to execute a confirming operation of confirming whether a liquid sending failure is detected by the liquid sending failure detector after the purge operation ends, and a non-injection analysis executer, when a liquid sending failure is not detected by the liquid sending failure detector in the confirming operation, configured to execute a non-injection analysis in which a mobile phase is sent into the analysis flow path by the liquid sending pump under a condition that enables removal of a sample in the analysis flow path wherein the analysis operation executer is configured to restart the scheduled analysis after the non-injection analysis is executed.

In a first aspect of the above-mentioned embodiment, the non-injection analysis executer is configured to send a mobile phase using the liquid sending pump into the analysis flow path under a condition that enables removal of a sample in the analysis flow path, for example, a same condition as a condition for an analysis that is executed immediately before the purge operation in the non-injection analysis. With such an aspect, a sample remaining in the analysis flow path can be removed efficiently from the analysis flow path, and reproducibility of analysis of a next sample can be improved.

Further, in a second aspect of the above-mentioned embodiment, the purge operation executer is configured to execute the purge operation again when a liquid sending failure is detected by the liquid sending failure detector in the confirming operation. With such an aspect, the purge operation is repeatedly executed multiple times, a liquid sending failure in the liquid sending pump is likely to be resolved.

In the above-mentioned second aspect, the analysis operation executer is configured to end the scheduled analysis when a liquid sending failure is detected by the liquid sending failure detector in the confirming operation after the purge operation is executed a predetermined number of times corresponding to a predetermined count. In a case where a liquid sending failure is not resolved even when the purge operation is executed multiple times, it is considered that there is a problem with the liquid sending pump itself. Thus, it is possible to solve the problem early by ending the scheduled analysis.

In the above-mentioned case, a purge count setter configured to set the predetermined count of the purge operation based on information input by the user may be included. If so, the user can set the count of the purge operation that is used as a criterion for determining whether there is a problem with the liquid sending pump as desired.

In a third aspect of the above-mentioned embodiment, a purge count setter configured to set the predetermined count for the purge operation based on information input by a user is included. With such an aspect, the time period during which the purge operation is executed can be set by the user as desired.

In a fourth aspect of the above-mentioned embodiment, the analysis operation executer is configured to end the scheduled analysis when a count of liquid sending failures detected by the liquid sending failure detector during the scheduled analysis exceeds a preset allowable count. In a case where a liquid sending failure is detected many times during one scheduled analysis, it is considered that there is a problem with the liquid sending pump itself. Thus, it is possible to resolve the problem early by ending the scheduled analysis in such a case.

REFERENCE SIGNS LIST

2 Liquid sending pump
4 Mobile phase supply flow path
6 Pressure sensor
8 Separation column
10 Detector
12 Analysis flow path
14 Autosampler (sample injector)
16 Switch valve
18 Management device
20 Analysis operation executer
22 Liquid sending failure detector
24 Purge operation executer
26 Confirming operation executer
28 Non-injection analysis executer
30 Purge count setter
32 Purge time setter

The invention claimed is:

1. A liquid chromatograph comprising:
a liquid sending pump that sends a mobile phase;
an analysis flow path having a separation column for separating a sample into components and a detector for detecting sample components obtained by separation in the separation column;
a pressure sensor that detects a liquid sending pressure applied by the liquid sending pump;
a sample injector for injecting a sample into the analysis flow path;
a switcher for switching a state between the liquid sending pump and the analysis flow path to a connection state or a disconnection state;
a liquid sending failure detector configured to compare a variation range of the liquid sending pressure detected by the pressure sensor with a preset threshold value, and detect a liquid sending failure caused by the liquid sending pump when the variation range of the liquid sending pressure exceeds the threshold value;
an analysis operation executer configured to control operations of the liquid sending pump, the sample injector and the switcher, and execute an analysis by putting the state between the liquid sending pump and the analysis flow path in a connection state and injecting a sample into the analysis flow path, as a scheduled analysis in regard to all of samples scheduled to be analyzed in a preset analysis schedule;
a purge operation executer, when a liquid sending failure is detected by the liquid sending failure detector during a sample analysis, configured to interrupt a sample analysis in execution, put the state between the liquid sending pump and the analysis flow path in a disconnection state and execute a purge operation of sending a liquid mobile using the liquid sending pump at a flow rate higher than a flow rate during the analysis for a preset purge time;
a confirming operation executer configured to execute a confirming operation of confirming whether a liquid sending failure is detected by the liquid sending failure detector after the purge operation ends; and
a non-injection analysis executer, when a liquid sending failure is not detected by the liquid sending failure detector in the confirming operation, configured to execute a non-injection analysis in which a mobile phase is sent into the analysis flow path by the liquid sending pump under a condition that enables removal of a sample in the analysis flow path, wherein the analysis operation executer is configured to restart the scheduled analysis after the non-injection analysis is executed.

2. The liquid chromatograph according to claim 1, wherein the non-injection analysis executer is configured to send a mobile phase using the liquid sending pump into the analysis flow path under a same condition as a condition for an analysis that is executed immediately before the purge operation in the non-injection analysis.

3. The liquid chromatograph according to claim 1, wherein the purge operation executer is configured to execute the purge operation again when a liquid sending failure is detected by the liquid sending failure detector in the confirming operation.

4. The liquid sending chromatograph according to claim 3, wherein the analysis operation executer is configured to end the scheduled analysis when a liquid sending failure is detected by the liquid sending failure detector in the confirming operation after the purge operation is executed a predetermined number of times corresponding to a predetermined count.

5. The liquid chromatograph according to claim 4, comprising a purge count setter configured to set the predetermined count for the purge operation based on information input by a user.

6. The liquid chromatograph according to claim 1, comprising a purge time setter configured to set the purge time based on information input by a user.

7. The liquid chromatograph according to claim 1, wherein the analysis operation executer is configured to end the scheduled analysis when a count of liquid sending failures detected by the liquid sending failure detector during the scheduled analysis exceeds a preset allowable count.

8. The liquid chromatograph according to claim 1, wherein the non-injection analysis includes sending a mobile phase into the analysis flow path using the liquid sending pump under a same condition as a condition for a sample analysis without injection of a sample.

* * * * *